United States Patent [19]

Shinozuka et al.

[11] Patent Number: 5,397,522
[45] Date of Patent: Mar. 14, 1995

[54] METHOD OF ENCAPSULATING AN ARTICLE

[75] Inventors: Akira Shinozuka, Matsudo; Yoshihisa Fujimoto, Noda, both of Japan

[73] Assignee: Somar Corporation, Japan

[21] Appl. No.: 422,065

[22] Filed: Oct. 16, 1989

[30] Foreign Application Priority Data

Oct. 18, 1988 [JP] Japan .................. 63-261996

[51] Int. Cl.⁶ .................. B29C 39/10; B29C 39/38
[52] U.S. Cl. .................. 264/134; 264/131; 264/272.11; 264/279
[58] Field of Search ............ 264/129, 131, 134, 137, 264/272.11, 275, 265, 279, 279.1; 427/189, 195

[56] References Cited

U.S. PATENT DOCUMENTS

| Re. 29,092 | 12/1976 | Schiefer et al. ............ 252/12.4 |
| 3,166,615 | 1/1965 | Farrell .................. 264/279 |
| 3,958,039 | 5/1976 | Yabuki et al. ............ 427/58 |
| 4,076,869 | 2/1978 | Flynn .................. 156/330 |
| 4,495,217 | 1/1985 | Schrum .................. 427/189 |
| 4,743,413 | 5/1988 | Galichon ................ 264/137 |

FOREIGN PATENT DOCUMENTS

| 2399907 | 4/1979 | France ............... 264/279 |
| 2028747 | 12/1971 | Germany ............ 264/272.11 |
| 2440806 | 3/1976 | Germany ............ 264/272.11 |
| 0155918 | 9/1983 | Japan ............... 264/279.1 |
| 1192617 | 5/1970 | United Kingdom . |

Primary Examiner—Jan H. Silbaugh
Assistant Examiner—A. Y. Ortiz
Attorney, Agent, or Firm—Lorusso & Loud

[57] ABSTRACT

A method of encapsulating an article such as an electric part is disclosed which includes the steps of:

(a) powder coating the article with a thermosetting resin powder coating composition to form a melted layer of the thermosetting resin composition around the article;

(b) molding the melted layer of the thermosetting resin composition obtained in step (a) in a mold under pressure while maintaining the mold at a temperature lower than the softening point of the thermosetting resin composition, so that a solidified, molded layer of the thermosetting resin composition having a predetermined shape is formed around the article; and (c) heating the solidified layer obtained in step (b) to cure the thermosetting resin.

5 Claims, No Drawings

METHOD OF ENCAPSULATING AN ARTICLE

FIELD OF THE INVENTION

This invention relates generally to a molding method and, more specifically, to a method of encapsulating an article such as an electric part, an electronic part, a machine part or a toy part with a resin coat having a predetermined shape.

DESCRIPTION OF THE RELATED ART

For the encapsulation of an article such as an electric part, there has been hitherto adopted a molding method, a dip coating method, a transfer molding method, a powder coating method or a compression molding method. The molding method, wherein an article is disposed within a mold cavity into which a melt of a resin is poured, has problems because the resin melt tends to cause skin irritation of workers and because the mold which has completed the casting of one cycle cannot be immediately used as such for the next step. The dip coating method and powder coating method have a problem because it is very difficult to obtain a coat having a precise dimension. The transfer molding method requires an expensive apparatus inclusive of a mold and is not economically acceptable unless applied to a mass production. Additionally, the transfer molding method cannot be applied to coating of large-sized articles. The pressure molding method wherein a resin is melted and cured within a mold cavity has a problem in productivity because the mold which has completed the casting of one cycle cannot be immediately used as such for the next step.

Japanese Published Unexamined Patent Application No. 51-114673 discloses a method of encapsulation of an electric part which includes the steps of powder coating the article with a powder coating composition, and molding the coated article within a previously heated mold while applying a pressure and a heat so as to cure the coating composition. While this method can give an encapsulated material having a precise dimension, the problem as seen in the above pressure molding method remains still unsolved.

SUMMARY OF THE INVENTION

The present invention has been made with the problems of the conventional methods in view and provides a method of encapsulating an article, comprising the steps of:

(a) powder coating the article with a thermosetting resin powder coating composition to form a melted layer of the thermosetting resin composition around the article;

(b) molding the melted layer of the thermosetting resin composition obtained in step (a) in a mold under pressure while maintaining the mold at a temperature lower than the softening point of the thermosetting resin composition, so that a solidified, molded layer of the thermosetting resin composition having a predetermined shape is formed around the article; and (c) heating the solidified layer obtained in step (b) to cure the thermosetting resin.

In the method of the present invention, the molding within the mold cavity is performed under cold conditions, namely at a temperature lower than the softening point of a thermosetting resin powder coating composition with which an article is coated. Therefore, the mold is repeatedly used as such so that the productivity of the method is significantly improved. Further, the coat with which the article is encapsulated has a high dimensional accuracy.

DETAILED DESCRIPTION OF THE PREFERRED EMBODIMENTS

The present invention will now be described in detail below.

An article to be encapsulated is first subjected to powder coating (step (a)) with a thermosetting resin powder coating composition. Any known powder coating composition can be suitably used for the purpose of the present invention. The powder coating composition generally contains a thermosetting resin, a curing agent, a curing accelerator, an inorganic filler and a coloring agent. An epoxy resin, a polyester resin or acrylic resin may be generally used as the thermosetting resin. The powder coating may be carried out by any known manner such as by a fluidized method, an electrostatic coating method or a powder spraying method. A fluidized method wherein the article preheated to a temperature higher than the melting point of the powder coating composition is contacted with a fluidized bed of the powder coating composition is suitably used for the purpose of the present invention, since the resulting coat is in a melted state. When an electrostatic coating method is adopted, the resulting coat is heated and melted before it is subjected to the next step (b).

The coated article obtained in step (a) and having the melted layer of the powder coating composition is then subjected to molding in a mold under pressure while maintaining the mold at a temperature lower than the softening point of the thermosetting resin composition (step (b)).

Preferably, the mold is composed of a pair of mold halves defining, when closed, a mold cavity therebetween. The article having the melted layer is placed in position between the separated, paired mold halves which are maintained at a temperature lower, preferably by 5°–100 ° C., more preferably 5°–15° C., than the softening point of the thermosetting resin composition. Then, the mold halves are closed to press and consolidate the melted resin composition over the article. The melted resin composition is thus cooled and solidified during the pressure molding, so that there is formed, around the article, a solidified, molded layer of the thermosetting resin composition having a predetermined shape. The external shape and dimension of the solidified, molded coat is in conformity with those of the mold cavity.

The solidified layer obtained in step (b) is then heated to cure the thermosetting resin (step (c)). It is preferable to remove, prior to step (c), fins or deposits of the thermosetting resin, if any, from the surface of the solidified layer, such as those formed in the root portions of lead wires of the article (e.g. an electronic part) protruded from the surface of the solidified layer.

For reasons of preventing the deformation of the molded layer, it is preferred that the curing of the molded layer be performed by a two stage method. In the first stage, the solidified molded layer is maintained at a first temperature ranging from the softening point of the molded layer (SP) −100° C. to SP +100° C., more preferably 0°–50° C. higher than the SP; and the heat treatment is continued until the molded layer becomes substantially infusible. In the second stage, the infusible layer surrounding the article is maintained at a second temperature higher than the first temperature to completely cure the thermosetting resin. Generally the second temperature is higher by 10° to 140° C., preferably by 40° to 140° C. than the softening point. In the case of epoxy resin powder coating composition, the first and second temperatures are generally 60°-150° C. and 100°-200° C., respectively.

Since, in the method according to the present invention, the pressure molding is performed at a temperature lower than the softening point of the thermosetting resin powder coating composition and since the curing of the resin is not effected in the mold, a large number of moldings may be obtained within a short period of time using one molding device. Generally, one cycle of the pressure molding requires only 1–15 seconds. Further, since the shape of the molded layer covering the article remains unchanged during the succeeding curing step, the encapsulated product has a high dimensional accuracy.

The method of the present invention is applicable to form a coat over a surface of various parts such as electric or electronic parts (e.g. transistors, diodes, integrated circuits, hybrid integral circuits, condensers, coils and network resistors), mechanical parts (e.g. gears) and toy parts.

The following examples will further illustrate the present invention.

EXAMPLE 1

An electric part of a radial lead type was packaged using a powder coating composition. The powder coating composition is a commercially available, thermosetting epoxy resin powder coating composition (EPIFORM F255 manufactured by Somar Corporation) having the following characteristics:

| | |
|---|---|
| Softening point: | about 65° C. |
| Gellation time: | 60 seconds at 150° C. |
| Particle size: | 80 mesh or finer |
| Recommended curing conditions: | 120° C., 60 minutes |
| Mold release agent: | none |

The electric part has a cubic body from which two lead wires extend outwardly. A flash-type mold composed of a pair of mold halves was used. The mold cavity has an inside dimension which is larger by 2 mm than the outer dimension of the electric part. The mold has grooves for permitting the lead wires to extend outwardly therethrough. Each groove had a diameter greater by 1 mm that the diameter of the lead wire. The lead wires were used for fixing the electric part in position between the mold halves. No mold-releasing agent was coated over the inside surface of the mold cavity.

The electric part preheated to 120° C. was immersed in a fluidized bed of the above powder coating composition to form a coat of the melted powder composition. This coating procedure was repeated a total of 5 times so that the melted coat had a thickness of about 2 mm. Immediately after the powder coating, the coated part was placed in position between the mold halves which were maintained at 50° C. The mold was closed to press the coated part within the mold cavity for 2 seconds at about 50 kg/cm$^2$. The electric part surrounded by the molded coat was released from the mold. Fins were found to be formed as a result of the flashover of the resin in the lead wire portions and in the portions corresponding to the seam of the closed mold halves. These fins were able to be easily removed. The resultant coated part was then heated at 65° C. for about 30 minutes and at 120° C. for about 60 minutes to cure the resin coat. The thus obtained encapsulated electric part had a smooth outer surface and a well defined shape.

EXAMPLE 2

A columnar metal body (diameter 10 mm, length: 10 mm) having two thin wire (diameter: 1 mm) extending from the bottom thereof was packaged using a powder coating composition. The powder coating composition used is a commercially available, thermosetting epoxy resin powder coating composition (EPIFORM F259 manufactured by Somar Corporation) having the following characteristics:

| | |
|---|---|
| Softening point: | about 140° C. |
| Gellation time: | 60 seconds at 200° C. |
| Particle size: | 80 mesh or finer |
| Recommended curing conditions: | 200° C., 30 minutes |
| Mold release agent: | none |

A flash-type mold composed of a pair of mold halves was used. The mold cavity has an inside dimension which is larger by 2 mm than the outer dimension of the metal body. The mold has grooves for permitting the wires to extend outwardly therethrough. Each groove had a diameter greater by 1 mm that the diameter of the wire. The wires were used for fixing the metal body in position between the mold halves. No mold-releasing agent was coated over the inside surface of the mold cavity.

The metal body preheated to 200° C. was immersed in a fluidized bed of the above powder coating composition to form a coat of the melted powder composition. This coating procedure was repeated a total of 5 times so that the melted coat had a thickness of about 1.2 mm. Immediately after the powder coating, the coated body was placed in position between the mold halves which were maintained at 50° C. The mold was closed to press the coated part within the mold cavity for 2 seconds at about 50 kg/cm$^2$. The metal body surrounded by the molded coat was released from the mold. Fins were found to be formed as a result of the flashover of the resin in the wire portions and in the portions corresponding to the seam of the closed mold halves. These fins were able to be easily removed. The resultant coated body was then heated at 160° C. for about 5 minutes and at 200° C. for about 30 minutes to cure the resin coat. The thus obtained encapsulated metal body had a smooth outer surface and a well defined shape.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of encapsulating an article, comprising the steps of:
   (a) powder coating the article with a thermosetting resin powder coating composition to encapsulate the article with a melted layer of the thermosetting resin composition;

(b) molding the melted layer of the thermosetting resin composition obtained in step (a) in a mold of predetermined shape under pressure while maintaining the mold at a temperature lower than the softening point of the thermosetting resin composition to mold said coating to said predetermined shape, thereby forming a solidified, molded layer of the thermosetting resin composition having a predetermined shape formed around the article; and (c) heating the shaped solidified layer obtained in step (b) to cure the thermosetting resin.

2. A method according to claim 1, wherein the molding is performed at a temperature lower by 5°–100° C. than the softening point of the thermosetting resin composition.

3. A method according to claim 1, wherein step (c) includes the sub-steps of:

maintaining the solidified layer at a first temperature within the range of from 100° C. below the softening point of the solidified layer to 100° C. above said softening point for a period of time sufficient to render the solidified layer substantially infusible; and maintaining the infusible layer at a second temperature higher than the first temperature to completely cure the thermosetting resin.

4. A method according to claim 3, wherein said second temperature is higher by 10° to 140° C. than said softening point.

5. A method according to claim 3, wherein said first temperature is 0° to 50° C. higher than the softening point of the solidified layer.

* * * * *